US009026577B1

(12) United States Patent
Johnston et al.

(10) Patent No.: US 9,026,577 B1
(45) Date of Patent: May 5, 2015

(54) DISTRIBUTED WORKFLOW MANAGEMENT SYSTEM

(75) Inventors: Simon K. Johnston, Snohomish, WA (US); Ramanathan Palaniappan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 541 days.

(21) Appl. No.: 13/402,490

(22) Filed: Feb. 22, 2012

(51) Int. Cl.
G06F 15/16 (2006.01)
G06Q 10/10 (2012.01)
G06Q 10/06 (2012.01)

(52) U.S. Cl.
CPC .......... *G06Q 10/0633* (2013.01); *G06Q 10/103* (2013.01)

(58) Field of Classification Search
USPC ................................. 709/202, 223
See application file for complete search history.

(56) References Cited

U.S. PATENT DOCUMENTS

| 5,937,388 | A | * | 8/1999 | Davis et al. ................... 705/301 |
| 5,987,422 | A | | 11/1999 | Buzsaki |
| 6,182,245 | B1 | | 1/2001 | Akin et al. |
| 2003/0018508 | A1 | * | 1/2003 | Schwanke .......................... 705/9 |
| 2004/0019512 | A1 | * | 1/2004 | Nonaka ............................. 705/8 |
| 2004/0254768 | A1 | * | 12/2004 | Kim et al. ..................... 702/189 |
| 2006/0179422 | A1 | | 8/2006 | Gortler |
| 2006/0195347 | A1 | * | 8/2006 | Bultmeyer et al. ............... 705/8 |
| 2008/0243902 | A1 | * | 10/2008 | Rong et al. ................... 707/102 |
| 2009/0281865 | A1 | * | 11/2009 | Stoitsev ........................... 705/9 |
| 2011/0055673 | A1 | * | 3/2011 | Teng et al. .................... 715/200 |
| 2011/0113287 | A1 | | 5/2011 | Gururaj |
| 2013/0219226 | A1 | | 8/2013 | Hachmeister et al. |

* cited by examiner

*Primary Examiner* — Philip B Tran
(74) *Attorney, Agent, or Firm* — Thomas Horstemeyer, LLP

(57) ABSTRACT

Disclosed are various embodiments for a workflow engine that obtains a workflow agent that comprises a workflow definition and a workflow history. The workflow engine determines a next action for the workflow agent based at least upon the workflow definition and the workflow history of the workflow agent. The workflow engine initiates the next action for the workflow agent. Subsequent actions may be initiated by the workflow engine or forwarded to another workflow engine.

20 Claims, 4 Drawing Sheets

DISTRIBUTED WORKFLOW MANAGEMENT SYSTEM

BACKGROUND

Workflow processing has become more and more complex over time. It can be difficult to implement workflow applications with current technologies that are not scalable and that do not offer the type of flexibility needed to handle significant complexity.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments of a scalable workflow management system based upon a model of workflow execution by stateful, independent workflow agents that are driven by stateless workflow engines. The workflow agents may be documents or other "file-like" entities that are instances of a given workflow comprising a workflow definition for the workflow and a workflow history for the given workflow agent. The workflow agents may be passed among a distributed network of workflow engines operating on various devices that are capable of processing the workflow agents. While each workflow engine is stateless, the present state of a given workflow agent may be obtained by interpreting the workflow definition, then tracing the execution along the workflow definition using the workflow history. In the following discussion, a general description of the system and its components is provided, followed by a discussion of the operation of the same.

Figure 1:
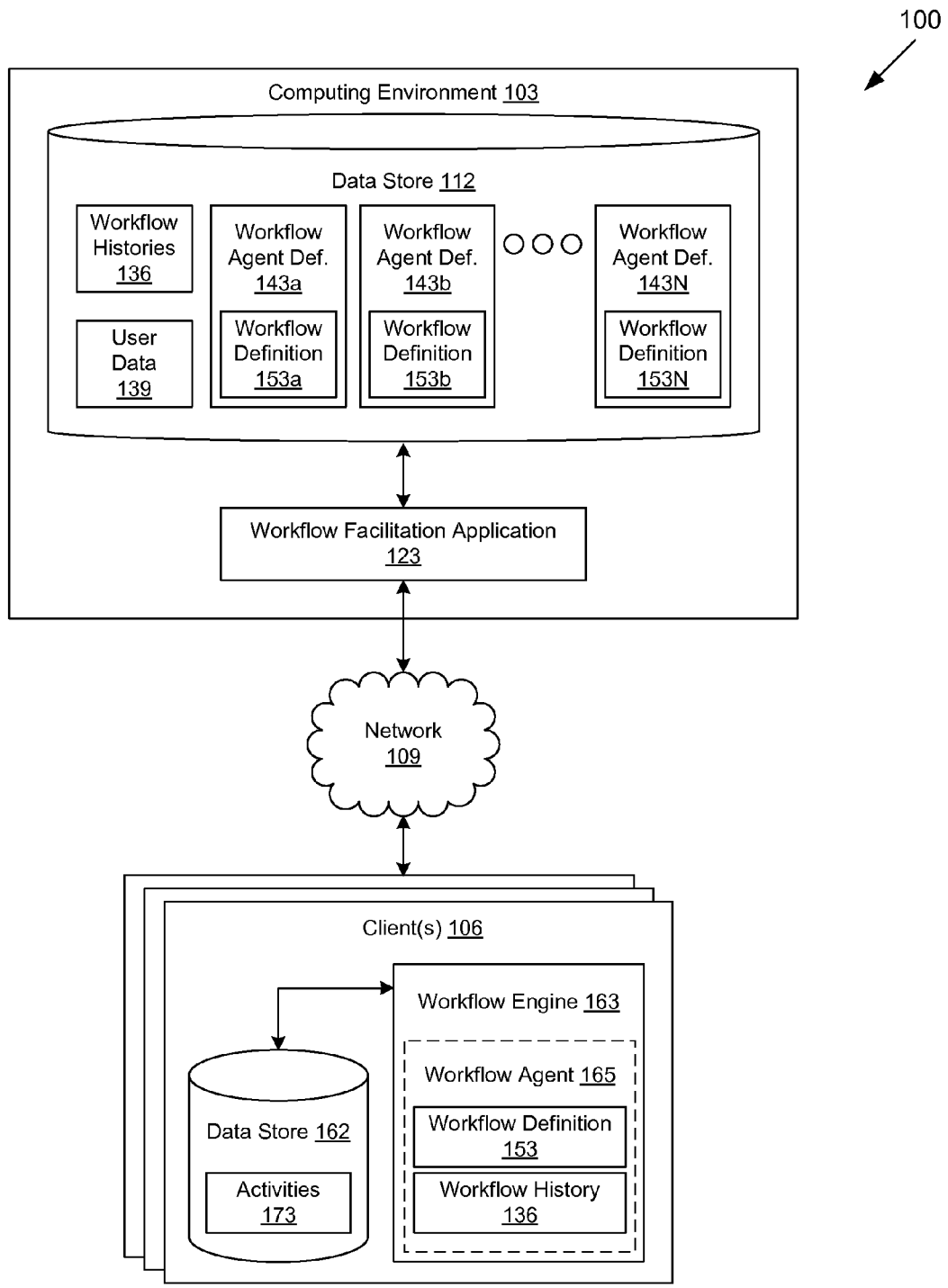
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a workflow facilitation application 123 and other applications, services, processes, systems, engines, or functionality not discussed in detail herein. The workflow facilitation application 123 is executed to orchestrate the implementation of instances of workflows ("workflow agents") as will be described.

The data stored in the data store 112 includes, for example, workflow histories 136, user data 139, several workflow agent definitions 143a-N, and potentially other data. Each workflow history 136 is associated with a respective one of the workflow agents processed by the workflow engine. The workflow histories 136 each comprise, for example, a list of events that have occurred during the implementation of a given workflow agent over time. To this end, the events listed in a given workflow history 136 act as a record of the implementation of a workflow agent. Such events may be expressed using, for example, extensible markup language (XML) or other such languages.

The user data 139 includes various data related to the users who may become associated with a workflow agent. The user data 139 may include, for example, names, identifiers, roles, a management chain, assignments, and/or other data associated with users as can be appreciated. Each workflow agent definition 143 is a template from which instances of workflow agents may be created. To this end, each workflow agent definition 143 comprises one of several workflow definitions 153a-N, data structures for storing a workflow history, data structures for storing state data associated with one or more states of a workflow agent, and/or other data associated with the workflow agent. In some embodiments, some portions of the workflow agent definition 143 may include data integrity and/or authentication mechanisms such as offered by digital signatures, message digests, and/or techniques as can be appreciated.

Each workflow definition 153 defines the activities, actions, and/or steps to be carried out for each instance of a workflow agent. In some embodiments, the workflow definition 153 may be expressed using functional logic as may be expressed, for example, in terms of programmed code. In other embodiments, the workflow definition 153 may be expressed using, for example, XML, or other such languages.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

Various applications and/or other functionality may be executed in the client 106 according to various embodiments. Also, various data is stored in a data store 162 that is accessible to the client 106. The data store 162 may be representative of a plurality of data stores 162 as can be appreciated. The data stored in the data store 162, for example, is associated with the operation of the various applications and/or functional entities described below.

The components executed on the client 106, for example, include a workflow engine 163, and other applications, services, processes, systems, engines, or functionality not discussed in detail herein. The workflow engine 163 is a stateless entity executed to process workflow agents 165. Each of the workflow agents 165 are stateful instances of the workflow agent definitions 143. The workflow engine 163 may embody a workflow agent 165 ultimately becoming a stateful, functional expression of a workflow definition 153a-N, In some embodiments, some portions of the workflow agent 165 may be include data integrity and/or authentication mechanisms such as offered by digital signatures, message digests, and/or techniques as can be appreciated.

In one embodiment, the workflow engine 163 comprises a class that may be instantiated multiple times. Furthermore, each workflow engine 163 may contain a queue of multiple workflow agents 165 in various states of execution. Thus, there may be many instances of various workflow agents 165 and workflow engines 163 executed by a client 106 at any given time. The workflow engine 163 may be programmed using any one of a number of different existing programming languages as can be appreciated.

The data stored in the data store 162 includes, for example, several activities 173 and potentially other data. Each of the activities 173 may be executed by the client 106 to perform or facilitate performance of one or more actions, tasks, or functions that comprise at least a portion of a given workflow agent 165 based upon a request from the workflow engine 163 as will be described. The activities 173 may facilitate performance of one or more actions, tasks, or functions of a given workflow instance 133 by, for example, initiating execution of one or more applications, providing notice to assignees of manual tasks, monitoring performance of the manual tasks, and/or other methods of facilitation as can be appreciated. The activities 173 may comprise a class that is instantiated multiple times to handle the workflow processing load from the workflow engine 163 as will be described.

The workflow processing system of the networked environment 100 is configured to implement workflow agents 165 that perform various functions. One example of such a workflow that may be embodied in workflow agents 165 might be a process to implement the payment for a purchase of an item online over the Internet. Such a process may involve various actions or tasks such as, for example, inputting a credit card number or other payment instrument, performing a fraud check on the payment instrument, and sending a shipment request to a fulfillment center to implement the fulfillment of the order. There may be many other actions or tasks involved in such a process, where the above actions or tasks are described merely for the purposes of illustration.

To this end, a workflow may involve various components, persons, applications, and other entities that are involved in the processing of data to complete a workflow agent 165. In the case of processing a payment for an order, for example, the order may be processed through various departments and other entities for ultimate authorization and purchase. A given workflow agent 165 may involve human intervention at some point, or may be entirely automated. The human intervention may involve interaction with a given activity 173 on the part of an individual as can be appreciated.

Next, a general discussion of the workflow processing system of the networked environment 100 is described with respect to the implementation of various workflow agents 165 according to various embodiments. To begin, a workflow engine 163 or an application external to the workflow processing system of the networked environment 100 may initiate the implementation of a workflow agent 165 by requesting such workflow agent 165 from a workflow facilitation application 123. The workflow facilitation application 123 ultimately creates the workflow agent 165 as an instance of a workflow agent definition 143. The workflow facilitation application 123 may maintain a status and/or a portion of the workflow history 136 for each workflow agent 165 to, for example, provide a central location for viewing the current state of previously created workflow agents 165.

The workflow agent 165 requested for instantiation may be returned to the requestor or forwarded to a workflow engine 163 associated with the first action of the workflow agent 165. The first action for a workflow agent 165 may be determined by the workflow facilitation application 123 based upon the workflow definition 153, as well as any initial state of the workflow agent 165. Upon selecting a workflow agent 165 for processing, the workflow engine 163 examines the workflow agent 165 to retrieve the workflow definition 153, workflow history 136, and other state data associated with the workflow agent 165. The state data may be present in the workflow agent 165 and/or in other data stores.

Once the respective workflow history 136, workflow definition 153, and other state data are obtained, then the workflow engine 163 processes the same to determine a next action to be taken for the respective workflow agent 165. To this end, the workflow engine 163 becomes a functional embodiment of a given workflow agent 165 by interpreting the workflow definition 153, then tracing the execution along the workflow definition 153 using the workflow history 136 and any associated state data to determine the next action.

Thereafter, the workflow engine 163 may initiate performance or facilitate performance of the next action to be implemented with respect to the workflow agent 165. When orchestrating the next action, the workflow engine 163 may record an event in the workflow history 136 of the respective workflow agent 165, and potentially the data store 112. For next actions performed or initiated by the local workflow engine, the workflow engine 163 may initiate an activity 173 to implement the next action. However, for next actions assigned to other clients 106 and/or users, the workflow engine 163 may instead forward the workflow agent 165 to a remote workflow engine 163 that is associated with the assignee.

As a non-limiting example, for the next action of a workflow agent 165 assigned to be performed by the user of the local client 106, the workflow agent 165 may remain with the local client 106 and respective workflow engine 163. However, for the next action of a workflow agent 165 assigned to be performed by, for example, a warehouse manager, the workflow agent 165 may be forwarded to a workflow engine 163 associated with the warehouse manager for completion.

In some embodiments, the workflow engine 163 may further query, for example, a directory or other data store to determine present computing resources of a remote assignee as a factor in determining whether to forward the workflow agent 165. As a non-limiting example, a query to a lightweight directory access protocol (LDAP) directory may indicate that the warehouse manager is currently available at his company desktop computer which has a workflow engine installed and available. In this example, the workflow agent may be forwarded to the workflow engine at the warehouse manager's computer based upon security, performance, reliability, and/or other factors associated with the computer and the workflow agent.

As another example, a query to the LDAP directory may instead indicate that the only workflow engine presently available to the warehouse manager is operating on her smartphone connected through the Internet. Due to security concerns, performance, reliability, and/or other factors, the local workflow engine may, if possible, choose to locally initiate the next action through an activity rather than forward the workflow agent to the remote workflow engine.

For the case of locally performed or initiated activities, once the activity 173 reports that the next action with respect to the workflow agent 165 has completed, the activity 173 sends a message to the workflow engine 163 that such processing is complete. Thereafter, the workflow engine 163 may record an event in the workflow history 136 of the respective workflow agent 165, and potentially the data store 112. The workflow engine 163 may then proceed to process the workflow agent 165 so that the next action may ultimately be performed for the workflow agent 165.

It should be noted that a next action to be taken for a workflow agent 165 may comprise an action or task inherent in the workflow of the workflow agent 165, or such action may comprise closing the workflow agent 165 due to the fact that the workflow is complete. If the workflow is complete, then the workflow engine 163 closes the workflow agent 165 by performing any needed closing tasks without applying the workflow agent 165 to an activity 173 as can be appreciated. Alternatively, an activity 173 may be employed that performs the closing tasks. Thereafter, the workflow engine 163 may record an event in the workflow history 136 of the respective workflow agent 165 and potentially the data store 112 indicating that the workflow agent 165 has completed.

In addition to the foregoing, the workflow engine 163 also records events in the respective workflow histories 136 of the workflow agent 165 that it handles and may potentially record events in the data store 112 and/or a log that remains local to a given workflow engine 163. As non-limiting examples, such events may include examining a workflow agent 165 by workflow engine 163; determining a next action to be taken for the workflow agent 165; determining which workflow engine 163 to use for processing the next action; forwarding a workflow agent 165 to a remote workflow engine 163; initiating an activity 173; receiving a workflow agent 165 from a remote workflow engine 163; and/or other events. In addition, events may record various failure conditions such as the failure of a workflow engine 163 to timely determine the next action to be performed, the failure of an activity 173 to perform one or more tasks with respect to the workflow agent 165, and/or other possible failure states.

Figure 2:
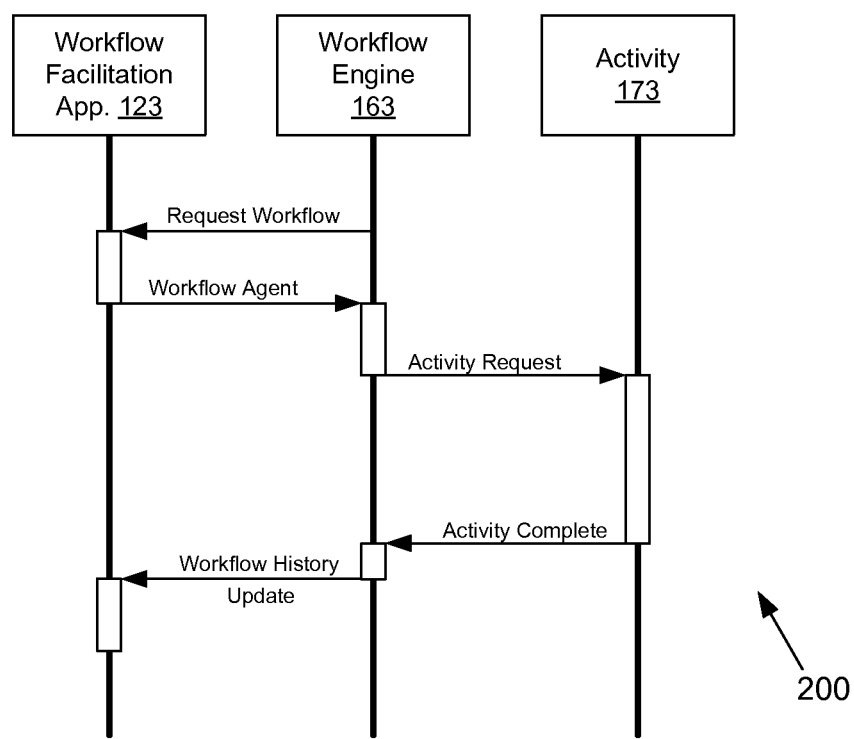
FIG. 2 is a drawing of a communication diagram that illustrates one example of communication between various components in a computing environment in the networked environment of FIG. 1 according to an embodiment of the present disclosure.

Referring next to FIG. 2, shown is a communication diagram 200 that illustrates one example of communication occurring between the workflow facilitation application 123, the workflow engine 163, and an activity 173 as described above according to an embodiment of the present disclosure. To begin, the workflow engine 163 makes a request to the workflow facilitation application 123 for a workflow agent 165 (FIG. 1) that is an instance of a workflow agent definition 143 (FIG. 1). The workflow facilitation application 123 then instantiates the workflow agent 165 with the respective workflow definition 153 and initializes the workflow history 136 and associated state data.

Responding to the request, the workflow facilitation application 123 returns the workflow agent 165 to the requesting workflow engine 163. Once the respective workflow history 136, workflow definition 153, and other state data are obtained, then the workflow engine 163 processes the same to determine the next action to be taken for the respective workflow agent 165. To this end, the workflow engine 163 becomes a functional embodiment of a given workflow agent 165 by interpreting the workflow definition 153, then tracing the execution along the workflow definition 153 using the workflow history 136 and any associated state data to determine the next action.

Upon determining the next action, the workflow engine 163 then transmits an activity request to a respective one of the activities 173 requesting the respective action be performed. All needed data to perform the action may be included in the activity request, or the activity request may include a pointer that indicates where such information is stored to be accessed by the respective activity 173. When sending the activity request, the workflow engine 163 may record an event in the workflow history 136 of the respective workflow agent 165. The activity 173 then proceeds to schedule and/or perform one or more tasks associated with the workflow agent 165.

Upon completion of the one or more tasks, the activity 173 sends a message to the workflow engine 163 indicating that such processing is complete. Thereafter, the workflow engine 163 may record an event in the workflow history 136 of the respective workflow agent 165, and potentially the data store 112. The workflow engine 163 may then proceed to process the workflow agent 165 so that the next action may ultimately be performed for the workflow agent 165.

In the case that the processing of the respective tasks by the activity 173 was unsuccessful for some reason, the activity 173 may send a message indicating the failure or error to the workflow engine 163. Thereafter, the workflow engine 163 may record an event in the workflow history 136 of the respective workflow agent 165, and potentially the data store 112.

Figure 3:
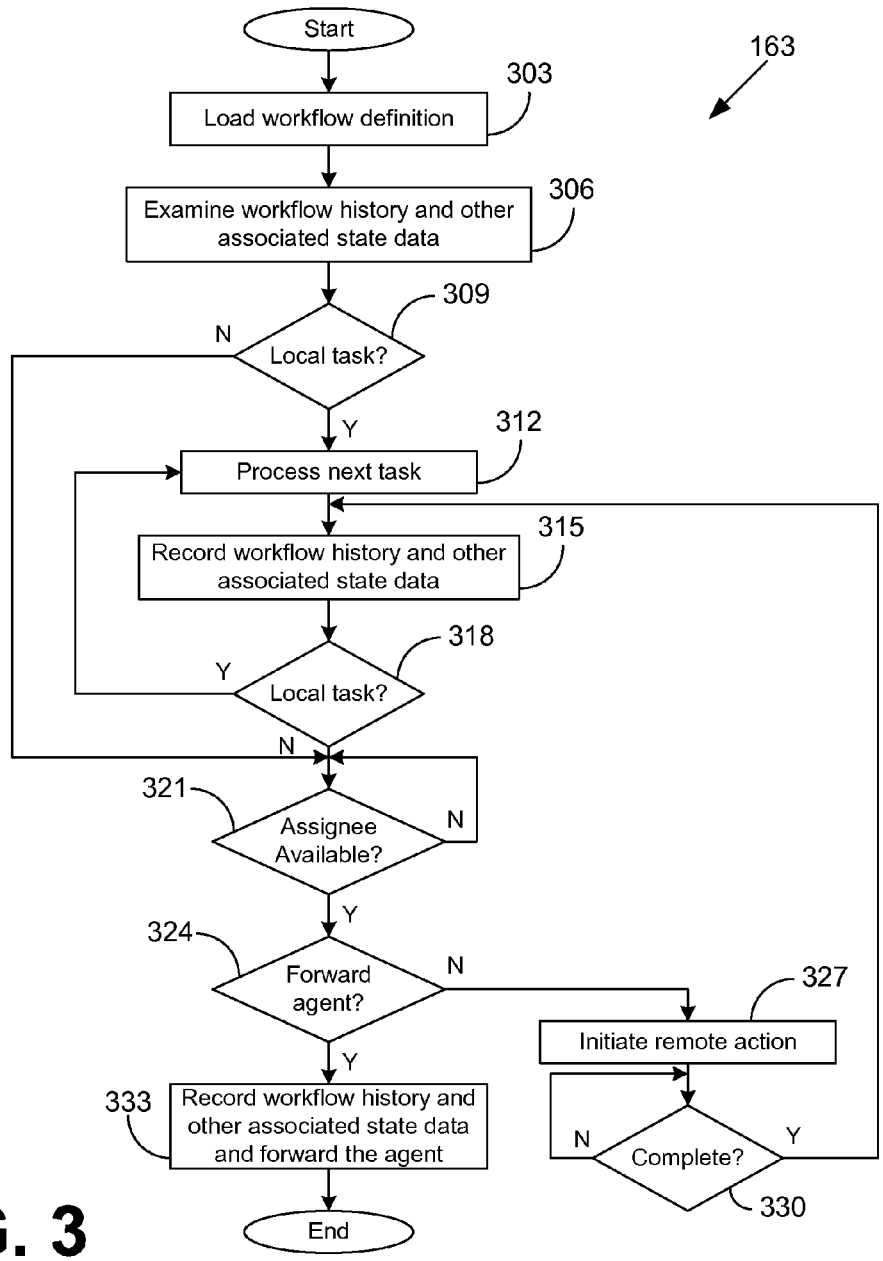
FIG. 3 is a flowchart illustrating one example of functionality implemented as portions of a workflow engine executed in a client device in the networked environment of FIG. 1 according to various embodiments of the present disclosure.

Turning now to FIG. 3, shown is a flowchart that provides one example of the operation of the workflow engine 163 according to various embodiments. It is understood that the flowchart of FIG. 3 merely provides an example of the many different types of functional arrangements that may be employed to implement the operation of the workflow engine 163 as described herein. As an alternative, the flowchart of FIG. 3 may be viewed as depicting an example of steps of a method implemented in the client 106 (FIG. 1) according to one or more embodiments.

This portion of the workflow engine 163 may be executed based at least upon a workflow agent 165 (FIG. 1) being obtained and selected for processing by the workflow engine 163. To begin, in box 303, the workflow engine 163 examines the workflow definition 153 (FIG. 1) of the workflow agent 165. In some embodiments, prior to examination, portions of the workflow agent 165 may first be validated using a digital signature, message digest, and/or other techniques for ensuring data integrity and/or authentication. As a non-limiting example, a digital signature of the workflow definition 153 provides the ability to determine if the workflow definition 153 has been modified since it was created. To this end, upon processing or "loading" a workflow agent 165, the workflow engine 163 becomes a functional embodiment of the workflow definition 153 that makes up the respective workflow agent 165.

Next, in box 306, the stateless workflow engine 163 may then acquire the present state of the workflow agent 165 along the workflow definition 153 by examining the workflow history 136 (FIG. 1) and associated state data of the workflow agent 165 to determine the next action. The next action of the workflow agent 165 may be determined based upon any associated state data within the workflow agent 165 and/or data obtained from sources external to the workflow agent such as, for example, data stores, directories, user input, and/or other data sources.

Next, in box 309, the workflow engine 163 determines whether the local workflow engine 163 will perform the next action of the workflow agent 165, or if the next action will be performed remotely. If the next action will be performed by a device other than the client 106, execution of the workflow engine 163 proceeds to box 321. Alternatively, if the next action will be performed by the client 106, at box 312, the workflow engine 163 may initiate an activity 173 (FIG. 1) to perform the next action.

Subsequently, at box 315, the workflow engine 163 records events in the respective workflow history 136 of the workflow agent 165, and may potentially record a portion of the events in a log of the workflow engine 163 and the respective workflow history 136 of the data store 112. The types of events that may be recorded include, for example, sending a workflow agent 165 to a workflow engine 163, initiating an activity 173 for the workflow agent 165, receiving a result from a respective activity for the workflow agent 165, and/or other events. In addition, the workflow engine 163 may record various failure conditions such as the failure of a workflow engine 163 to timely determine the next action to be performed, the failure of a cryptographic hash or message digest associated with a workflow agent 165, the failure of a scheduled activity to perform one or more tasks with respect to the workflow for a workflow agent 165, and/or other possible failure conditions as can be appreciated.

Thereafter, at box 318, the workflow engine 163 again determines whether the local workflow engine 163 will perform the next action of the workflow agent 165, or if the next action will be performed remotely. As discussed previously, if the next action will be performed by a device other than the client 106, execution of the workflow engine 163 proceeds to box 321. Alternatively, if the next action will be performed by the client 106, execution of the workflow engine 163 returns to box 312.

Next, at box 321, the workflow engine 163 may determine an assignee for the next action performed remotely to the client 106 and if the assignee is available. The assignee may be determined from the workflow definition 153 of the workflow agent 165, an LDAP server, a data store, and/or other assignment methods as can be appreciated. If the workflow agent 165 determines that no remote workflow engine 163 associated with the assignee is available, execution of the workflow engine 163 may continue to loop at box 321, periodically checking availability.

Alternatively, if a remote workflow engine 163 associated with the assignee is available, execution proceeds to box 324. At box 324, the workflow engine 163 determines whether to forward a workflow agent 165 to a remote workflow engine 163 or initiate the next action through a remote request over the network 109 made by the local workflow engine 163. As discussed previously, the determination may be made based at least upon a response from an LDAP directory and/or another data store.

If, at box 333, processing of the workflow agent 165 is to be carried out using a remote workflow engine 163, then the workflow engine 163 records events in the respective workflow history 136 of the workflow agents 165 that it handles, and may potentially record a portion of the events in the respective workflow histories 136 of the data store 112. Once the present state of the workflow agent 165 has been stored within the agent itself by the workflow engine 163, the workflow agent 165 may be forwarded to the remote workflow engine 163. Thereafter, this portion of the workflow engine 163 ends as shown.

Alternatively, if the next action is to be initiated in a remote computing device by the local workflow engine 163, then, at box 327, the workflow engine 163 initiates the next action in the remote computing device. Subsequently, at box 330, the workflow engine 163 determines if a result is received from the execution of the next action in the remote computing device. If no result is received, execution of the workflow engine 163 may continue to loop at box 330. Alternatively, once a result is received, execution of the workflow engine 163 returns to box 315.

Figure 4:
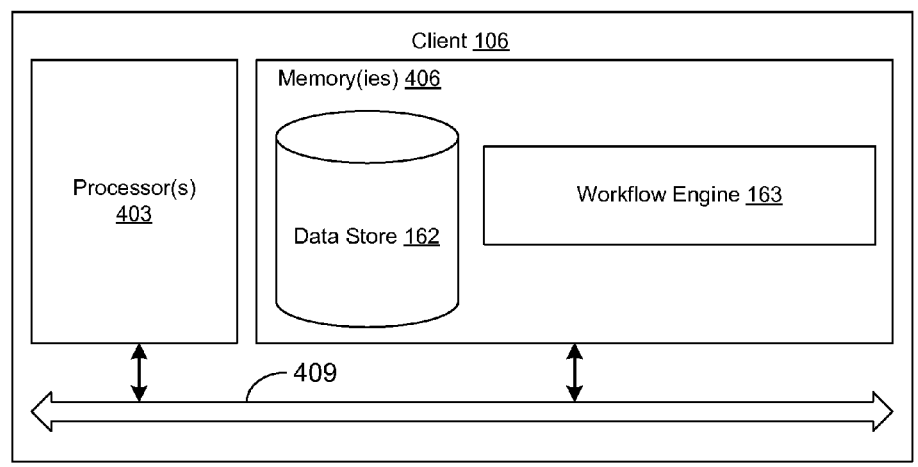
FIG. 4 is a schematic block diagram that provides one example illustration of the client device employed in the networked environment of FIG. 1 according to various embodiments of the present disclosure.

With reference to FIG. 4, shown is a schematic block diagram of the client 106 according to an embodiment of the present disclosure. The client 106 includes at least one processor circuit, for example, having a processor 403 and a memory 406, both of which are coupled to a local interface 409. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the workflow engine 163, and potentially other applications. Also stored in the memory 406 may be a data store 162 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the workflow facilitation application 123, workflow engine 163, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the workflow engine 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the workflow facilitation application 123 and workflow engine 163, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a first workflow engine executable in a first computing device, the first workflow engine comprising:
   code that, in response to receiving a workflow agent comprising a workflow definition, a workflow history, and a plurality of state data corresponding to a plurality of states of the workflow definition, determines a first one of a plurality of actions to be taken for the workflow agent based at least upon the workflow definition, the workflow history, and a first portion of the state data, wherein the workflow agent is a document received from a prior computing device via a network and wherein a digital signature is associated with the workflow definition and the first workflow engine determines whether the digital signature is valid;
   code that, in response to a determination that the digital signature associated with the workflow definition is valid, initiates the first one of the plurality of actions to be taken for the workflow agent, wherein the first one of the plurality of actions is performed in the first computing device;
   code that stores a first result of the first one of the plurality of actions in the workflow history of the workflow agent and in a data store via the network, wherein a message digest is associated with the workflow history, and the message digest is computed for the workflow history;

code that determines a second one of the plurality of actions to be taken for the workflow agent based at least upon the workflow definition, the workflow history, and a second portion of the state data, wherein an assignee of the second one of the plurality of actions is determined based at least upon the workflow definition of the workflow agent and a query to a directory via the network;

code that stores an update in the workflow history of the workflow agent and in the data store via the network, wherein the update comprises the assignee and an identifier of the first workflow engine, wherein the message digest is computed for the workflow history; and code that forwards, via the network, the workflow agent to a second workflow engine associated with the assignee of the second one of the plurality of actions to be taken for the workflow agent, wherein the second workflow engine is associated with a second computing device.

2. The computer-readable medium of claim 1, further comprising:

code that instructs, via the network, a third computing device to perform a third one of the actions, wherein the third one of the actions is determined based at least upon the workflow definition, the workflow history, and a third portion of the state data; and code that stores a second result of the third one of the actions in the workflow history of the workflow agent and in the data store via the network, wherein the message digest is computed for the workflow history.

3. The computer-readable medium of claim 1, further comprising code that stores the workflow history of the workflow agent in the data store via the network.

4. A system, comprising:

a plurality of computing devices in data communication via a network; and a plurality of workflow engines executable in the plurality of computing devices, a first one of the workflow engines comprising:

logic that, in response to receiving a workflow agent comprising a workflow definition, a workflow history, and a digital signature, determines whether a digital signature of the workflow definition is valid;

logic that, in response to a determination that the digital signature associated with the workflow definition is valid, initiates a first one of a plurality of actions to be taken for the workflow agent, wherein the first one of the actions is determined based at least upon the workflow definition and the workflow history of the workflow agent; and logic that forwards, via the network, the workflow agent to a second one of the workflow engines associated with an assignee of a second one of the actions to be taken for the workflow agent, wherein the assignee is determined based at least upon the workflow definition and the workflow history of the workflow agent, and the second one of the workflow engines is associated with a second one of the plurality of computing devices.

5. The system of claim 4, wherein the workflow agent further comprises a plurality of state data associated with execution of a portion of the plurality of actions.

6. The system of claim 5, wherein the first one of the plurality of actions and the second one of the plurality of actions is determined based further upon the state data of the workflow agent.

7. The system of claim 4, further the first one of the plurality of workflow engines further comprises logic that stores a first result of the first one of the plurality of actions in the workflow history of the workflow agent.

8. The system of claim 4, further comprising logic that stores a log of a plurality of activities of the first one of the plurality of workflow engines in a data store of the first one of the plurality of computing devices.

9. The system of claim 4, wherein the workflow agent contains a message digest associated with the workflow definition and the workflow history of the workflow agent.

10. The system of claim 4, wherein the assignee is determined further based at least in part upon a query to a data store over the network.

11. The system of claim 10, wherein the assignee is determined further based upon a plurality of characteristics associated with the second one of the plurality of actions and a second one of the plurality of computing devices associated with the assignee, as reported by the data store.

12. The system of claim 4, further the first one of the plurality of workflow engines further comprises logic that instructs, via the network, a third one of the plurality of computing devices to perform a third one of the plurality of actions for the workflow agent.

13. A method, comprising:

receiving, in a first one of a plurality of computing devices, a workflow agent comprising a workflow definition and a workflow history, wherein the plurality of computing devices are in data communication via a network, the workflow agent is received via the network, and the workflow agent contains a digital signature associated with the workflow definition;

determining, in the first one of the plurality of computing devices, whether the digital signature associated with the workflow definition is valid;

initiating, in the first one of the plurality of computing devices, a first one of a plurality of actions to be taken for the workflow agent in response to a determination that the digital signature associated with the workflow definition is valid, wherein the first one of the actions is determined based at least upon the workflow definition and the workflow history of the workflow agent;

transmitting, in the first one of the plurality of computing devices, an instruction to a second one of the plurality of computing devices to perform a second one of the actions for the workflow agent, wherein the instruction is transmitted via the network; and forwarding, in the first one of the plurality of computing devices, the workflow agent to a third one of the plurality of computing devices to perform a third one of the actions to be taken for the workflow agent, wherein the instruction is transmitted via the network.

14. The method of claim 13, wherein the second and third ones of the plurality of computing devices are determined based at least upon the workflow definition and the workflow history of the workflow agent.

15. The method of claim 14, wherein the second and third ones of the plurality of computing devices are determined further based at least in part upon a query to a directory service over the network.

16. The method of claim 15, wherein the third one of the plurality of computing devices is determined further based at least in part upon a plurality of characteristics associated with the third one of the plurality of actions and the third one of the plurality of computing devices as reported by the directory service.

17. The method of claim 13, wherein the workflow agent further comprises a plurality of state data associated with execution of a portion of the plurality of actions.

18. The method of claim 13, further comprising storing, in the first one of the plurality of computing devices, a plurality of results associated with the first and second ones of the plurality of actions in the workflow history of the workflow agent.

19. The method of claim 18, further comprising generating, in the first one of the plurality of computing devices, a directive to store at least the plurality of results in a data store over the network.

20. The method of claim 13, wherein the workflow definition comprises an initial workflow state for the workflow agent.

\* \* \* \* \*